United States Patent
Kusano

(10) Patent No.: US 9,482,311 B2
(45) Date of Patent: Nov. 1, 2016

(54) POWER TRANSMISSION BELT AND METHOD FOR MANUFACTURING SAME

(71) Applicant: BANDO CHEMICAL INDUSTRIES, LTD., Kobe-shi (JP)

(72) Inventor: Takayuki Kusano, Kobe (JP)

(73) Assignee: BANDO CHEMICAL INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/659,458

(22) Filed: Mar. 16, 2015

(65) Prior Publication Data

US 2015/0211601 A1   Jul. 30, 2015

Related U.S. Application Data

(60) Division of application No. 14/612,141, filed on Feb. 2, 2015, which is a continuation of application No. PCT/JP2013/004447, filed on Jul. 22, 2013.

(30) Foreign Application Priority Data

Aug. 2, 2012   (JP) .................. 2012-172213

(51) Int. Cl.
| | |
|---|---|
| F16G 5/00 | (2006.01) |
| F16G 1/28 | (2006.01) |
| F16G 5/20 | (2006.01) |
| F16G 1/00 | (2006.01) |
| F16G 9/00 | (2006.01) |
| F16G 1/08 | (2006.01) |
| B29D 29/10 | (2006.01) |
| F16H 7/02 | (2006.01) |
| B29C 59/02 | (2006.01) |
| F16G 1/10 | (2006.01) |

(Continued)

(52) U.S. Cl.
CPC .............. *F16G 1/28* (2013.01); *B29C 59/02* (2013.01); *B29D 29/103* (2013.01); *F16G 1/08* (2013.01); *F16G 1/10* (2013.01); *F16G 5/08* (2013.01); *F16G 5/20* (2013.01); *F16H 7/023* (2013.01); *B29K 2023/16* (2013.01); *B29K 2105/24* (2013.01); *B29K 2105/253* (2013.01); *B29K 2995/0072* (2013.01); *B29L 2029/00* (2013.01); *F16H 7/02* (2013.01)

(58) Field of Classification Search
CPC ......... B65G 15/34; B65G 15/64; F16G 5/20; F16G 1/08; F16G 1/28
USPC ....................... 474/238, 251, 263
See application file for complete search history.

(56) References Cited

U.S. PATENT DOCUMENTS 3,050,178 A * 8/1962 Stone .................. B65G 23/06
                                                                198/834
3,404,577 A * 10/1968 Zahn .................. F16G 5/00
                                                                474/148

(Continued)

FOREIGN PATENT DOCUMENTS

| CN | 200958549 Y | 10/2007 |
| CN | 201013833 Y | 1/2008 |

(Continued)

*Primary Examiner* — Henry Liu
(74) *Attorney, Agent, or Firm* — Knobbe Martens Olson & Bear LLP

(57) ABSTRACT

A power transmission belt has an uneven surface of rubber which when the power transmission belt is wound around a flat pulley, comes in contact with the flat pulley. The uneven surface has projected parts each having a flat top surface.

10 Claims, 7 Drawing Sheets

(51) Int. Cl.
*F16G 5/08* (2006.01)
*B29K 23/00* (2006.01)
*B29K 105/24* (2006.01)
*B29K 105/00* (2006.01)
*B29L 29/00* (2006.01)

(56) References Cited

U.S. PATENT DOCUMENTS

| | | | | |
|---|---|---|---|---|
| 4,311,474 A | * | 1/1982 | Standley | F16G 1/28 156/137 |
| 4,773,895 A | * | 9/1988 | Takami | F16G 5/20 474/238 |
| 5,447,476 A | * | 9/1995 | White, Jr. | F16H 7/02 474/238 |
| 5,518,460 A | | 5/1996 | White, Jr. et al. | |
| 5,624,338 A | * | 4/1997 | Kawashima | F16G 5/20 474/263 |
| 5,704,862 A | * | 1/1998 | Janne | F16G 5/20 474/168 |
| 5,779,584 A | | 7/1998 | Noguchi | |
| 6,103,349 A | * | 8/2000 | Matsumoto | F16G 1/00 198/502.1 |
| 6,350,182 B2 | * | 2/2002 | Hayashi | 451/188 |
| 6,464,607 B1 | * | 10/2002 | Rosenboom | C08L 23/16 474/263 |
| 6,558,282 B2 | * | 5/2003 | Danhauer | F16G 5/20 474/266 |
| 6,672,983 B2 | * | 1/2004 | Mohr | F16G 1/28 474/152 |
| 7,008,341 B2 | | 3/2006 | Wilson et al. | |
| 7,210,573 B2 | * | 5/2007 | Mol | B65G 15/42 198/846 |
| 7,810,637 B2 | * | 10/2010 | Gundlach | B65G 15/64 198/834 |
| 7,926,649 B2 | * | 4/2011 | Goser | B29C 43/22 187/251 |
| 8,192,315 B2 | * | 6/2012 | Westelaken | F16G 5/20 474/238 |
| 8,262,523 B2 | * | 9/2012 | Kanzow | D04B 1/18 474/268 |
| 8,469,846 B2 | * | 6/2013 | Westelaken | F16G 5/20 474/238 |
| 8,480,521 B2 | * | 7/2013 | Inukai | F16G 1/08 474/237 |
| 8,579,774 B2 | * | 11/2013 | Derscheid | A01F 15/18 198/835 |
| 8,871,329 B2 | | 10/2014 | Yoshida et al. | |
| 8,944,948 B2 | * | 2/2015 | Matsuda | F16G 1/08 474/260 |
| 9,127,746 B2 | | 9/2015 | Onita et al. | |
| 2001/0019936 A1 | * | 9/2001 | Hayashi | B29D 29/103 451/51 |
| 2004/0063532 A1 | | 4/2004 | Nakamoto et al. | |
| 2006/0234820 A1 | * | 10/2006 | Yamamoto | B65G 15/34 474/266 |
| 2006/0237289 A1 | * | 10/2006 | Nozaki | B65G 15/34 198/847 |
| 2007/0023127 A1 | | 2/2007 | Onita et al. | |
| 2007/0032326 A1 | | 2/2007 | Westerkamp | |
| 2007/0249451 A1 | | 10/2007 | Wu et al. | |
| 2008/0051240 A1 | * | 2/2008 | Goser | B29C 43/22 474/205 |
| 2008/0108466 A1 | | 5/2008 | Pelton et al. | |
| 2009/0042684 A1 | * | 2/2009 | Takahashi | B29C 33/42 474/263 |
| 2009/0105027 A1 | * | 4/2009 | Takahashi | F16G 1/28 474/249 |
| 2010/0018842 A1 | * | 1/2010 | Gundlach | B65G 23/06 198/834 |
| 2010/0059343 A1 | * | 3/2010 | Uchida | B65G 15/64 198/844.1 |
| 2010/0203993 A1 | * | 8/2010 | Matsukawa | F16G 5/20 474/251 |
| 2010/0216583 A1 | * | 8/2010 | Westelaken | F16G 5/20 474/238 |
| 2011/0003659 A1 | | 1/2011 | Wu et al. | |
| 2011/0009251 A1 | * | 1/2011 | Derscheid | A01F 15/18 492/30 |
| 2011/0160014 A1 | * | 6/2011 | Kawahara | F16G 5/20 474/148 |
| 2011/0285388 A1 | | 11/2011 | Tomioka et al. | |
| 2012/0021860 A1 | * | 1/2012 | Matsuda | F16G 1/08 474/260 |
| 2012/0165145 A1 | * | 6/2012 | Kitano | B65G 15/32 474/264 |
| 2012/0214630 A1 | * | 8/2012 | Westelaken | F16G 5/20 474/238 |
| 2014/0274520 A1 | | 9/2014 | Witt | |
| 2015/0024892 A1 | | 1/2015 | Hineno et al. | |

FOREIGN PATENT DOCUMENTS

| | | |
|---|---|---|
| CN | 102317645 | 1/2012 |
| DE | 1820785 U | 10/1960 |
| JP | S58-024546 U | 8/1981 |
| JP | S62-15642 U | 1/1987 |
| JP | 3011680 U | 3/1995 |
| JP | H10-2380 A | 1/1998 |
| JP | 2001-050351 A | 2/2001 |
| JP | 2002-168307 A | 6/2002 |
| JP | 2002-235805 A | 8/2002 |
| JP | 2004-84790 A | 3/2004 |
| JP | 2004-144105 A | 5/2004 |
| JP | 2005-61593 A | 3/2005 |
| JP | 2006-292134 A | 10/2006 |
| JP | 2009-156467 A | 7/2009 |

* cited by examiner

BELT LENGTH DIRECTION

POWER TRANSMISSION BELT AND METHOD FOR MANUFACTURING SAME

CROSS-REFERENCE TO RELATED APPLICATION

This application is a divisional of U.S. application Ser. No. 14/612,141, filed on Feb. 2, 2015, which is a continuation of International Application No. PCT/JP2013/004447, filed Jul. 22, 2013, which claims priority to Japanese Patent Application No. 2012-172213 filed on Aug. 2, 2012, the entire disclosure of which is incorporated by reference herein.

BACKGROUND

The present invention relates to power transmission belts and methods for manufacturing the power transmission belts.

Belt transmission systems for driving accessories of automobiles include a serpentine drive system in which, for example, a V-ribbed belt is wrapped around a crank shaft pulley, a power steering pulley, an air conditioning pulley, a water pump pulley, and an AC generator pulley, for example.

Some of the belt transmission systems of this type are configured to give tension to a V-ribbed belt by pushing the back surface of the V-ribbed belt using an auto tensioner or a flat pulley such as a fixed idler pulley.

Japanese Unexamined Patent Publication No. 2005-61593 discloses providing a rubber layer having an uneven pattern of woven cloth without layering a cover canvas on the back surface of the V-ribbed belt, to reduce noise made, for example, by adhesion abrasion due to contact of the back surface of the V-ribbed belt with the idler pulley.

SUMMARY

A power transmission belt of the present invention has an uneven surface of rubber which when the power transmission belt is wrapped around a flat pulley, comes in contact with the flat pulley, and the uneven surface has projected parts each having a flat top surface.

According to a method of manufacturing the power transmission belt of the present invention, a rubber composition is pressed against a molding surface that is a transfer surface of an uneven surface where each of projected parts has a flat top surface, thereby forming the uneven surface that comes in contact with the flat pulley.

DETAILED DESCRIPTION

Embodiments will be described in detail below based on the drawings.

First Embodiment

Figure 1:
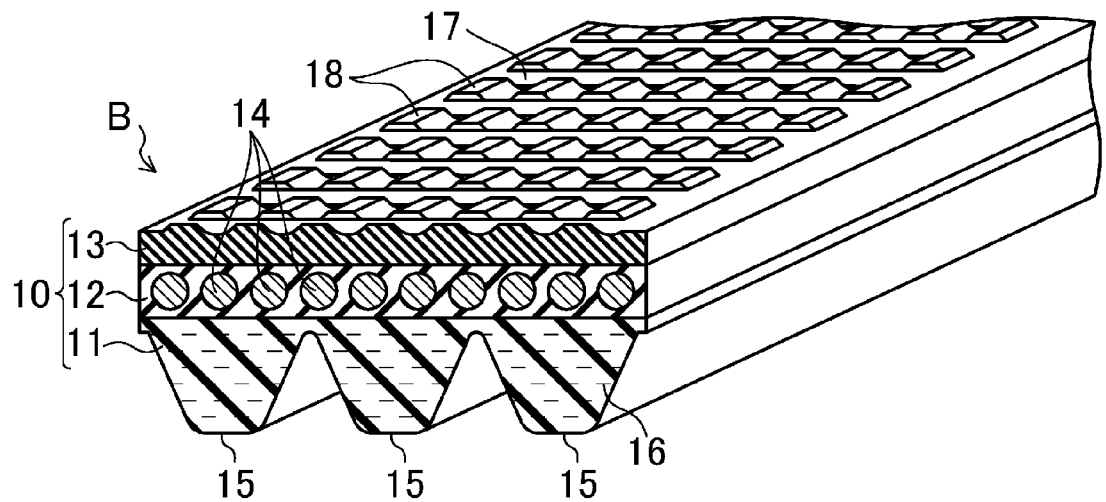
FIG. 1 is an oblique view of a V-ribbed belt of the first embodiment.

FIG. 1 illustrates a V-ribbed belt B of the first embodiment. The V-ribbed belt B of the first embodiment is of endless type used, for example, in a belt transmission system for driving an accessory of an automobile placed in an engine compartment of the automobile. The V-ribbed belt B of the first embodiment has a length of 700 to 3000 mm, a width of 10 to 36 mm, and a thickness of 4.0 to 5.0 mm, for example.

The V-ribbed belt B of the first embodiment includes a three-layered rubber-made V-ribbed belt body 10 which includes a compression rubber layer 11 which is present on an inner surface of the belt and constitutes a pulley contact portion, an intermediate adhesion rubber layer 12, and a backside rubber layer 13 constituting an outer surface of the belt. A cord 14 arranged so as to form a helical pattern at a predetermined pitch in a width direction of the belt is embedded in the adhesion rubber layer 12.

The compression rubber layer 11 includes a plurality of V-shaped ribs 15 protruding from the inner surface of the belt. Each of the plurality of V-shaped ribs 15 is in the shape extending in the longitudinal direction of the belt and having an approximately inverted triangular cross-section, and the plurality of V-shaped ribs 15 are arranged in parallel to one another in the width direction of the belt. Each of the V-shaped ribs 15 has, for example, a height of 2.0 to 3.0 mm, and a width of 1.0 to 3.6 mm at a proximal end. The belt includes 3 to 10 ribs (3 ribs in FIG. 1).

The adhesion rubber layer 12 is in the shape of a strip having a horizontally elongated rectangular cross-section, and has a thickness of 1.0 to 2.5 mm, for example.

The backside rubber layer 13, too, is in the shape of a strip having a horizontally elongated rectangular cross-section, and has a thickness of 0.4 to 0.8 mm, for example. A surface of the backside rubber layer 13, that is, a surface which, as will be described later, comes in contact with a flat pulley when the belt is wrapped around the flat pulley, is configured to have an uneven surface 17 of rubber, and the top surface of each of the projected parts of the uneven surface 17 is a flat surface.

The outer diameter (the maximum outer diameter) of each of the projected parts of the uneven surface 17 of the backside rubber layer 13 is preferably 0.3 mm or more, more preferably 0.5 mm or more, and preferably 1.4 mm or less, and more preferably 1.2 mm or less, in plan view. The height of the projected part, that is, the surface roughness (Rz) of the uneven surface 17 is preferably 0.05 mm or more, and more preferably 0.1 mm or more, and preferably 0.25 mm or less, and more preferably 0.2 mm or less. The surface roughness (Rz) of the uneven surface 17 can be measured by a surface roughness meter, based on Appendix 1 of JISB0601 (2001). The plurality of projected parts of the uneven surface 17 of the backside rubber layer 13 may be a mixture of projected parts having different dimensions, but preferably have the same dimension.

Each of the projected parts of the uneven surface 17 of the backside rubber layer 13 has a vertical cross section in the shape of a trapezoid, a horizontally elongated rectangle, or a vertically elongated rectangle, for example. Each of the projected parts of the uneven surface 17 of the backside rubber layer 13 has a circular, triangular, rectangular, polygonal, or undefined plan view, for example. The plurality of projected parts of the uneven surface 17 of the backside rubber layer 13 may be a mixture of projected parts having different vertical cross sections and/or plan views, but preferably have the same vertical cross section and the same plan view.

The plurality of projected parts of the uneven surface 17 of the backside rubber layer 13 may be discretely disposed, may be continuously disposed, or alternately may be disposed such that groups, each consisting of a plurality of continuously-formed projected parts, are discretely disposed. In the case where the projected parts are discretely disposed, or the groups each consisting of a plurality of continuously-formed projected parts are discretely disposed, a distance between the projected parts or a distance between the groups of the projected parts is 1.0 to 1.5 mm, for example. In the case where the projected parts are discretely disposed, or the groups each consisting of a plurality of continuously-formed projected parts are discretely disposed, the projected parts or the groups of the projected parts may be disposed in a regular manner so as to form a pattern, or may be disposed in a random manner.

Of the area of the uneven surface 17 of the backside rubber layer 13 in plan view, the total area of the flat top surfaces 18 of the projected parts is preferably 10% or more, and more preferably 30% or more, and preferably 60% or less, and more preferably 50% or less. The area of the top surfaces 18 of the projected parts can be measured by three dimensional roughness measurement equipment.

The uneven surface 17 may be formed to have the same pattern as that of a woven fabric, a knitted fabric, an unwoven fabric, or a cord fabric, for example. Of these patterns, the uneven surface 17 preferably has the same pattern as that of a surface of a rep weave fabric.

Figure 2:
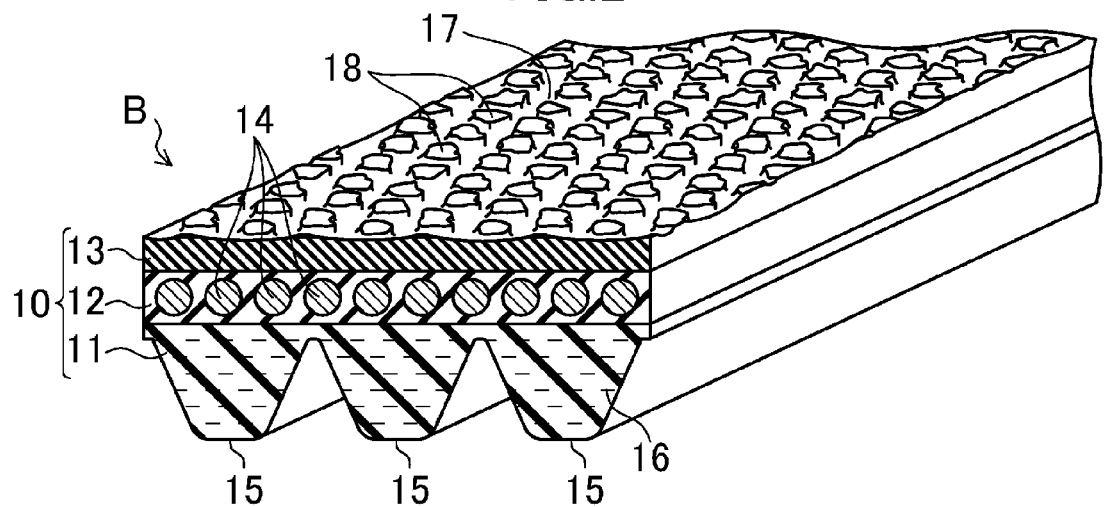
FIG. 2 is an oblique view of a variation of the V-ribbed belt of the first embodiment.
Figure 3:
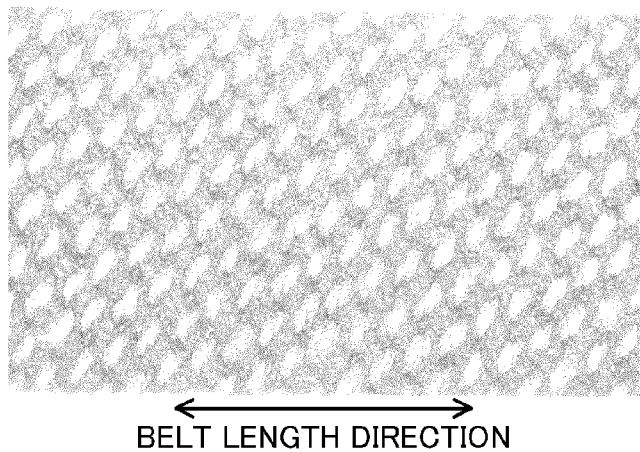
FIG. 3 is a picture of the back surface of the V-ribbed belt shown in FIG. 2.
Figure 4:
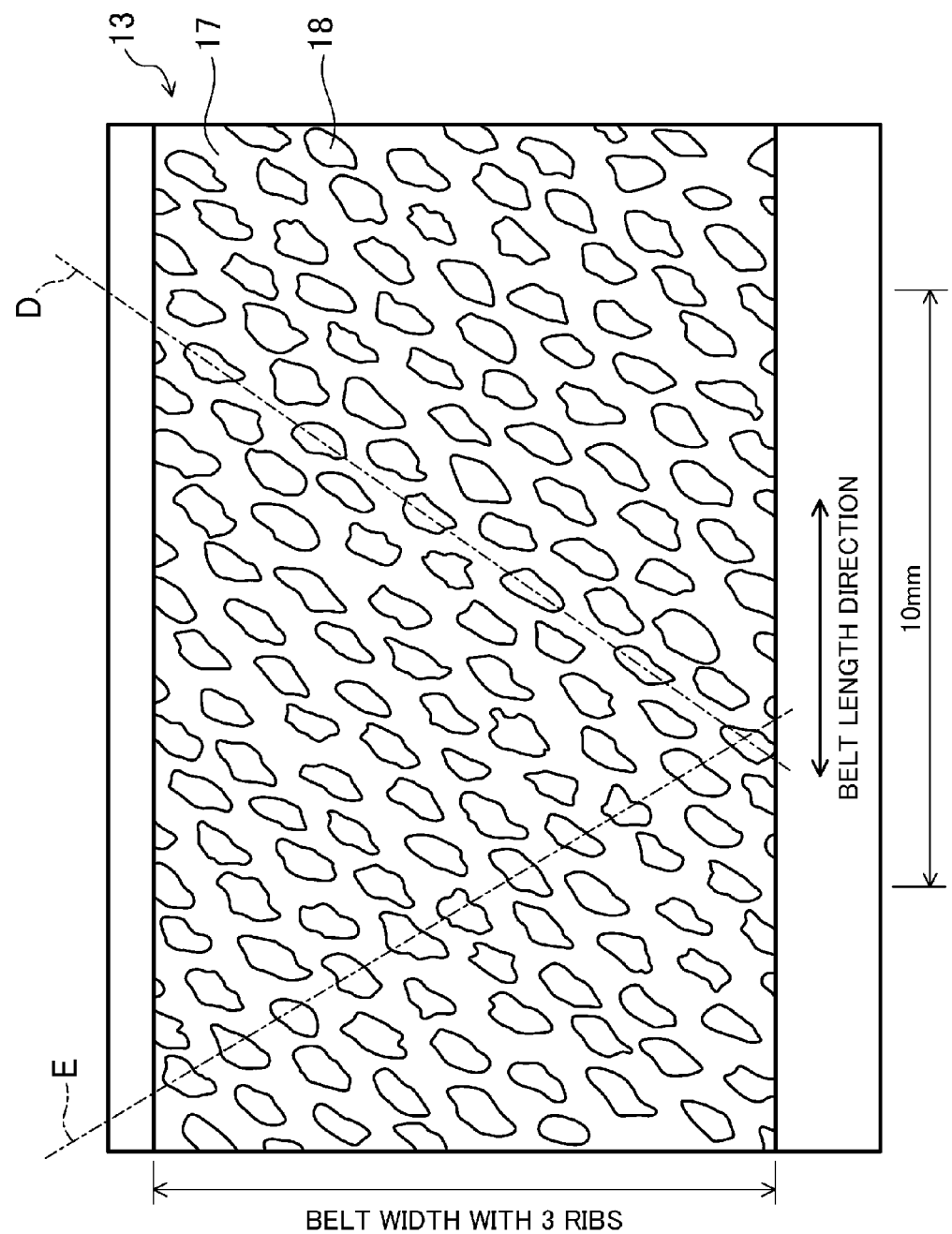
FIG. 4 is a plan view of the back surface of the V-ribbed belt shown in FIG. 2.
Figure 5:
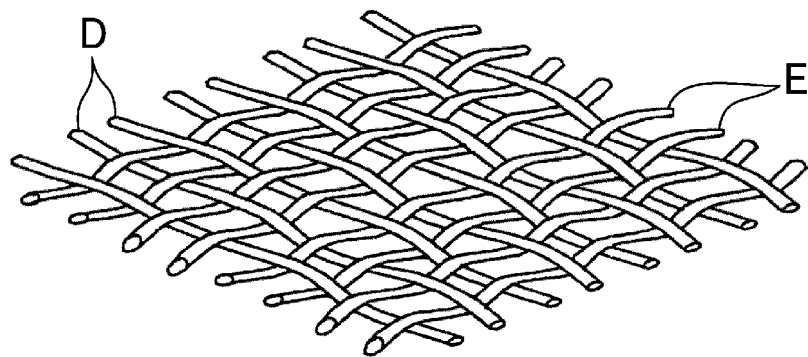
FIG. 5 is an oblique view of a weaving structure of weft rep weave.
Figure 6:
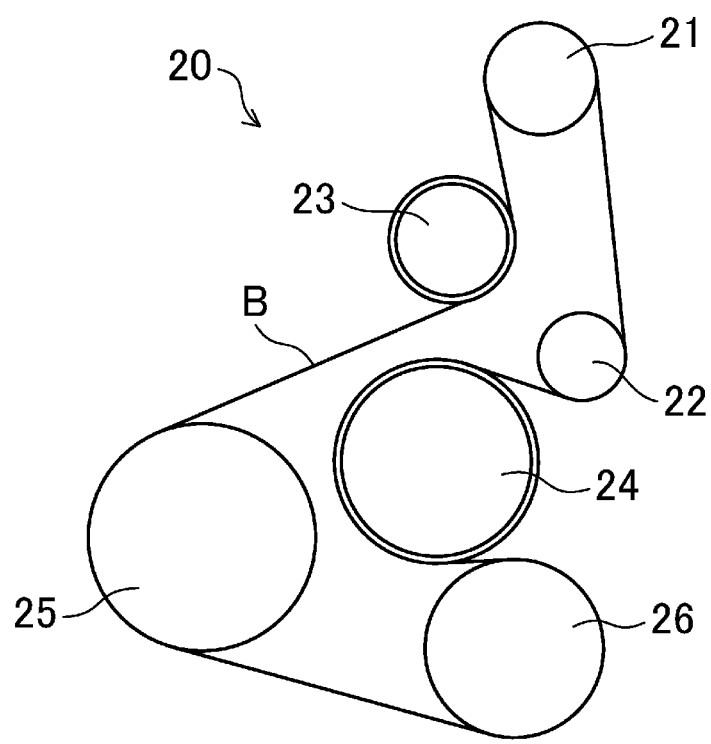
FIG. 6 illustrates a layout of pulleys of a belt transmission system for driving an accessory of an automobile, using the V-ribbed belt of the first embodiment.

FIG. 2 illustrates a variation of the V-ribbed belt shown in FIG. 1, and depicts a V-ribbed belt B having an uneven surface 17 which has the same pattern as that of the surface of the rep weave fabric disclosed in FIGS. 5 and 6 of Japanese Patent No. 3722478. FIG. 3 is a picture in 1600× 1200 pixels, showing the enlarged uneven surface 17 of the V-ribbed belt B of FIG. 2. Here, 931 pixels are 10 mm. FIG. 4 illustrates the projected parts of the uneven surface 17 of the FIG. 3, and also indicates the directions of the weft yarn D and the warp yarn E of the rep weave fabric. The top surface 18 of each of the projected part is in an approximately oval shape.

The rep weave fabric may have a weaving structure of weft rep weave, or may have a weaving structure of warp yarn rep weave in which the warp yarn and the weft yarn are replaced with each other. For example, as illustrated in FIG. 5, a weft rep weave fabric is woven by having one weft yarn D go under and over two warp yarns E as a unit, and has a pattern in which the weft yarn D is alternately visible on the front and back surfaces with intervals of two warp yarns E, and a pattern in which an adjacent weft yarn D is alternately visible on the front and back surfaces with intervals of two warp yarns E in the opposite manner. Of course, the pattern may be such that the weft yarn D is alternately visible on the front and back surfaces with intervals of three or more warp yarns E. In the uneven surface 17 having the same pattern as that of the surface of a rep weave fabric, the projected parts are formed of intersections between the weft yarn D and the warp yarn E. In the uneven surface 17 having the same pattern as that of the surface of a rep weave fabric, the warp yarn and the weft yarn may intersect with a belt length dimension, or the warp yarn or the weft yarn may extend along the belt length dimension. In the uneven surface 17 having the same pattern as that of the surface of a rep weave fabric, the warp yarn and the weft yarn may be orthogonal to each other, or may intersect at an angle other than 90°.

The V-ribbed belt disclosed in Japanese Unexamined Patent Publication No. 2005-61593 may be prevented from slipping in the wet state, and prevented from generating noise. However, when the uneven surface of rubber is brought into contact with a flat pulley, the projected parts of the uneven surface may form a point contact or a line contact with the flat pulley, and this may abrade the back surface of the belt and produce more rubber powder, which adheres to the back surface and the flat pulley, and generates noise between the back surface and the flat pulley, as a result.

In contrast, in the V-ribbed belt B of the first embodiment, the surface of the backside rubber layer 13 which comes in contact with a flat pulley when the belt is wrapped around the flat pulley is formed to be the uneven surface 17 of rubber where each of the projected parts has the flat top surface 18. Thus, the state of contact of the surface of the backside rubber layer 13 with the flat pulley is a surface contact, which disperses the force applied. As a result, in addition to the effects of preventing slipping in the wet state and preventing generation of noise, it is possible to reduce abrasion of the surface of the backside rubber layer 13 which is formed to be the uneven surface 17 of rubber.

The compression rubber layer 11, the adhesion rubber layer 12, and the backside rubber layer 13 are made of a rubber composition produced by heating and pressing an uncrosslinked rubber composition prepared by kneading a rubber component blended with various ingredients, and crosslinking the kneaded product by a crosslinker. The rubber composition may be crosslinked using sulfur as the crosslinker, or may be crosslinked using organic peroxides as the crosslinker.

The compression rubber layer 11, the adhesion rubber layer 12, and the backside rubber layer 13 may be made of different compositions, or may be made of the same composition. In order to reduce adhesion between the belt back surface and the flat pulley in contact with the belt back surface, the backside rubber layer 13 is preferably made of a rubber composition which is slightly harder than the rubber composition of the adhesion rubber layer 12.

Example rubber components of the rubber composition forming the compression rubber layer 11, the adhesion rubber layer 12, and the backside rubber layer 13 include, for example, an ethylene-α-olefin elastomer (such as EPDM and EPR), chloroprene rubber (CR), chlorosulfonated polyethylene rubber (CSM), hydrogenated acrylonitrile-butadiene rubber (H-NBR), etc. Example ingredients include a reinforcing material, a filler, an antioxidant, a softener, a crosslinker, a vulcanization accelerator, etc. The rubber composition forming the compression rubber layer 11 may contain short fibers 16 such as nylon short fibers. In that case, the short fibers 16 contained in the compression rubber layer 11 are preferably oriented in the belt width direction, and preferably protrude from the surface of the compression rubber layer 11. The short fibers 16 do not need to be mixed in the rubber composition forming the compression rubber layer 11, but may be adhered to the surface of the compression rubber layer 11.

The cord 14 is made of twisted yarn of polyethylene terephthalate (PET) fiber, polyvinyl alcohol (PVA) fiber, polyethylene naphthalate (PEN) fiber, para-aramid fiber, meta-aramid fiber, 4,6 nylon fiber, 6,6 nylon fiber, carbon fiber, or glass fiber, for example, which is subjected to an adhesion treatment using a resorcin/formalin/latex (RFL) solution before molding and vulcanization.

FIG. 6 illustrates a layout of pulleys of a belt transmission system 20 for driving an accessory of an automobile, using the V-ribbed belt B of the first embodiment. The belt transmission system 20 for driving an accessory is a serpentine drive system in which the V-ribbed belt B is wrapped around six pulleys including four ribbed pulleys and two flat pulleys to transmit power.

The belt transmission system 20 for driving an accessory includes: a power steering pulley 21 at the uppermost position; an AC generator pulley 22 located at slightly lower right position of the power steering pulley 21; a tensioner pulley 23, which is a flat pulley, located at a lower left position of the power steering pulley 21 and upper left position of the AC generator pulley 22; a water pump pulley 24, which is a flat pulley, located at a lower left position of the AC generator pulley 22 and directly below the tensioner pulley 23; a crank shaft pulley 25 located at a lower left position of the tensioner pulley 23 and the water pump pulley 24; and an air conditioning pulley 26 located at a lower right position of the water pump pulley 24 and the crank shaft pulley 25. Among these pulleys, the pulleys other than the tensioner pulley 23 and the water pump pulley 24, which are flat pulleys, are all ribbed pulleys. The ribbed pulleys and the flat pulleys are made of pressed metals or castings, or resin moldings using nylon resin and phenol resin, for example, with a pulley diameter of 50 to 150 mm.

In the belt transmission system 20 for driving an accessory, the V-ribbed belt B is wrapped around the power steering pulley 21 such that the V-shaped ribs 15 of the compression rubber layer 11 come in contact with the power steering pulley 21, and then wrapped around the tensioner pulley 23 such that the uneven surface 17 of the backside rubber layer 13 comes in contact with the tensioner pulley 23. After that, the V-ribbed belt B is sequentially wrapped around the crank shaft pulley 25 and the air conditioning pulley 26 such that the V-shaped ribs 15 of the compression rubber layer 11 come in contact with the crank shaft pulley 25 and the air conditioning pulley 26, wrapped around the water pump pulley 24 such that the uneven surface 17 of the backside rubber layer 13 comes in contact with the water pump pulley 24, wrapped around the AC generator pulley 22 such that the V-shaped ribs 15 of the compression rubber layer 11 come in contact with the AC generator pulley 22, and returns to the power steering pulley 21 in the end.

The V-ribbed belt B of the first embodiment is used in the belt transmission system 20 for driving an accessory, and the surface of the backside rubber layer 13 which comes in contact with the tensioner pulley 23 and the water pump pulley 24, i.e., flat pulleys, when the belt is wrapped around the flat pulleys, is formed to be the uneven surface 17 of rubber where each of the projected parts has a flat top surface 18. Thus, the state of contact of the surface of the backside rubber layer 13 with the tensioner pulley 23 and the water pump pulley 24 is a surface contact, which disperses the force applied. As a result, in addition to the effects of preventing slipping in the wet state and preventing generation of noise, it is possible to reduce abrasion of the surface of the backside rubber layer 13 which is formed to be the uneven surface 17 of rubber. Thus, it is possible to prevent the rubber powder which comes off due to abrasion from adhering to the surface of the backside rubber layer 13 and/or the flat pulley, and prevent generation of noise caused by the rubber powder.

Now, an example method of manufacturing the V-ribbed belt B of the first embodiment will be described based on FIG. 7 and FIG. 8.

According to the method of manufacturing the V-ribbed belt B of the first embodiment, a cylindrical rubber mold 31 is formed beforehand.

First, cloth 35 is subjected to a rubber attachment treatment. The rubber attachment treatment includes, for example, an RFL treatment, a rubber cement soaking treatment, a rubber cement coating treatment, a friction treatment, etc.

Figure 7A:
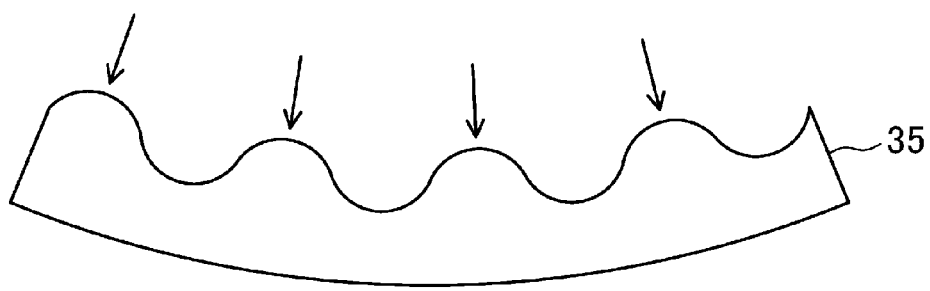
FIG. 7A to FIG. 7D are illustrated to explain a method for forming the uneven surface of the back surface of the V-ribbed belt of the first embodiment.
Figure 7B:
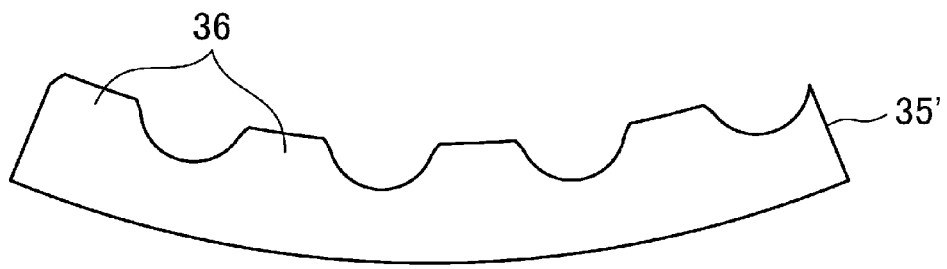

Next, a surface treatment is performed on the cloth 35, using a vulcanizer (not shown). Specifically, the cloth 35 is formed into a cylindrical shape, and the obtained cloth 35 is placed on the outer circumference of a cylindrical mold having a smooth outer circumferential surface. The cylindrical mold to which the cloth 35 is placed is placed in the vulcanizer, and a predetermined temperature and a predetermined pressure are applied. At this moment, as shown in FIG. 7A, the cloth 35 is pressurized and pushed against the cylindrical mold in a sealed state. As a result, the projected parts of the uneven surface of the inner circumferential surface of the cloth 35 are flattened, and as shown in FIG. 7B, the top surfaces 36 of the projected parts are formed into a flat surface.

Next, the cylindrical mold is cooled, and the inner space of the vulcanizer is depressurized and unsealed. Then the pressurized cloth (hereinafter referred to as "pressurized cloth 35'") is taken out together with the cylindrical mold.

Figure 7C:
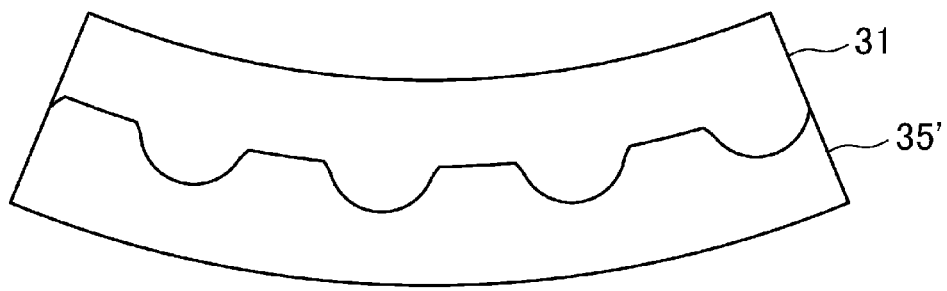
Figure 7D:
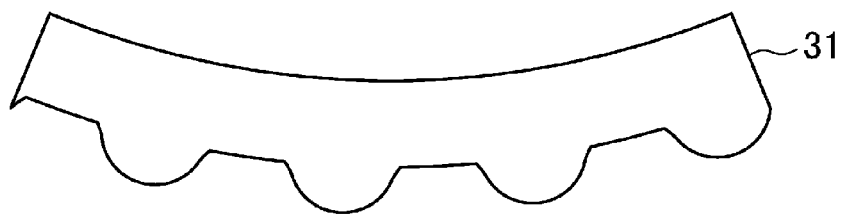

Then, as shown in FIG. 7C, the pressurized cloth 35' is wrapped around the outer circumference of the cylindrical rubber mold 31 made of an uncrosslinked rubber composition, such as hydrogenated acrylonitrile-butadiene rubber (H-NBR), chloroprene rubber (CR), ethylene-α-olefin elastomer (such as EPDM and EPR), such that the uneven surface where each of the projected parts has a flat top surface comes in contact with the outer circumference of the cylindrical rubber mold 31. Then, the cylindrical rubber mold 31 is put on the cylindrical mold and placed in the vulcanizer for application of a predetermined temperature and a predetermined pressure. At this moment, in the vulcanizer, the cylindrical rubber mold 31 is crosslinked, and the inner circumferential surface of the uneven surface of the pressurized cloth 35' where each of the projected parts has a flat top surface 36 is pressed against and transferred to the outer circumferential surface of the cylindrical rubber mold 31, thereby forming a molding surface.

Lastly, the cylindrical mold is cooled, and the inner space of the vulcanizer is depressurized and unsealed. Then the cylindrical rubber mold 31 combined with the pressurized cloth 35' is taken out, and the pressurized cloth 35' is removed from the cylindrical rubber mold 31, thereby obtaining the cylindrical rubber mold 31 shown in FIG. 7D.

Next, a method of manufacturing the V-ribbed belt B using the above-described cylindrical rubber mold 31 will be explained using FIG. 8.

First, a rubber component is blended with ingredients, and is kneaded by a mixer, such as a kneader and a Banbury mixer. The obtained uncrosslinked rubber composition is shaped into a sheet by a calender, etc., thereby forming uncrosslinked rubber sheets (uncrosslinked rubber compositions for forming a belt) 11', 12', 13' respectively for forming the compression rubber layer 11, the adhesion rubber layer 12, and the backside rubber layer 13. In the case of forming the compression rubber layer 11 containing short fibers, the short fibers 16 may be blended in the uncrosslinked rubber sheet 11'. Further, after twisted yarn 14' to be the cord 14 is subjected to an adhesion treatment in which the twisted yarn 14' is immersed in an RFL solution and heated, the twisted yarn 14' is subjected to another adhesion treatment in which the twisted yarn 14' is immersed in rubber cement and heated and dried.

Figure 8D:
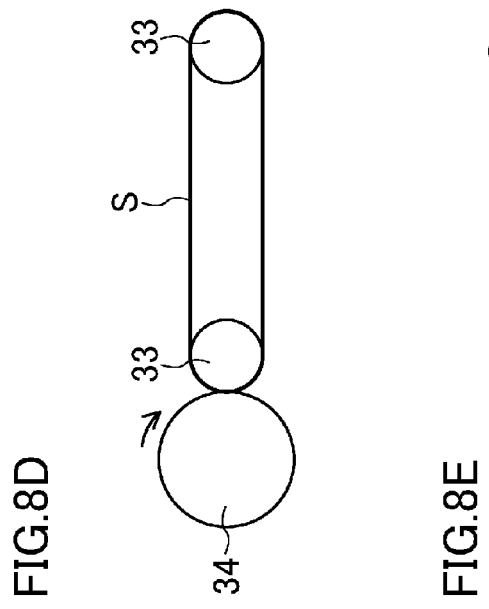
FIG. 8A to FIG. 8E are illustrated to explain a method of manufacturing the V-ribbed belt of the first embodiment.
Figure 8E:
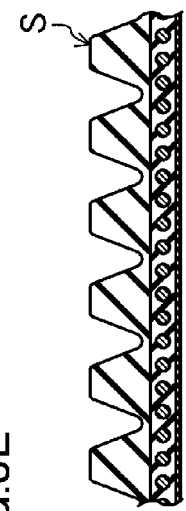
Figure 8A:
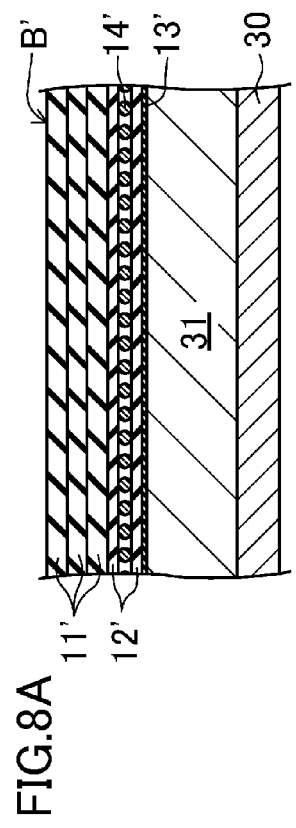

Next, as shown in FIG. 8A, the cylindrical rubber mold 31 obtained as described above is put on the cylindrical mold 30. The uncrosslinked rubber sheet 13' for the backside rubber layer 13 and the uncrosslinked rubber sheet 12' for the adhesion rubber layer 12 are sequentially wrapped around and layered on the molding surface on the outer circumference of the cylindrical rubber mold 31. The cord 14 is wound around the resultant layers on the cylindrical rubber mold 31 in a helical manner, with a predetermined tension applied to the cord 14. After that, the uncrosslinked rubber sheet 12' for the adhesion rubber layer 12 and the uncrosslinked rubber sheet 11' for the compression rubber layer 11 are sequentially wrapped around and layered thereon, thereby forming a belt formation body B'.

Figure 8B:
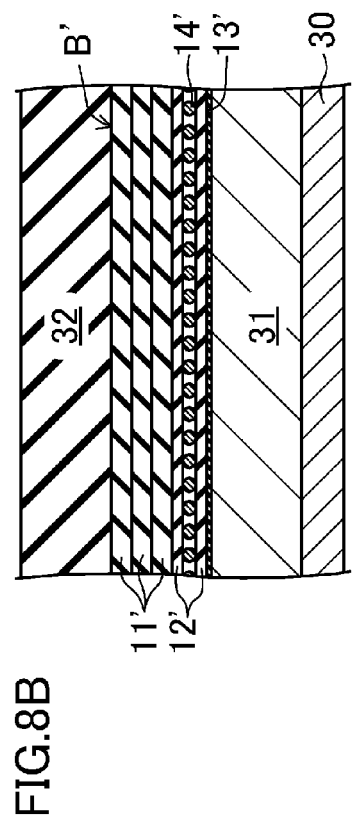
Figure 8C:
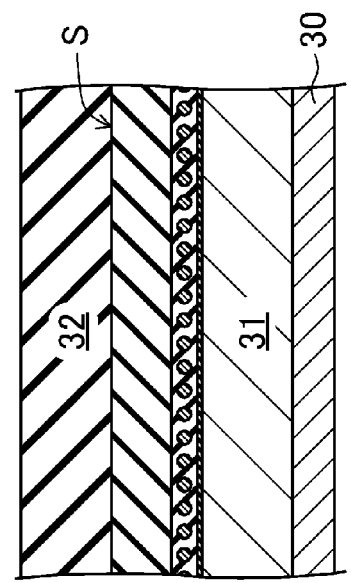

Subsequently, as shown in FIG. 8B, a rubber sleeve 32 is put on the belt formation body B', which is placed in a vulcanizer and the vulcanizer is sealed. The vulcanizer is filled with high-temperature and high-pressure steam, and the belt formation body B' with the rubber sleeve 32 is held in the vulcanizer for a predetermined molding time. At this moment, as shown in FIG. 8C, cross-linking is promoted between the uncrosslinked rubber sheets 11', 12' and 13' and the rubber sheets 11', 12' and 13' are integrated together and combined with the cord 14. As a result, a cylindrical belt slab S is molded. The molding surface on the outer circumferential surface of the cylindrical rubber mold 31 is transferred to the inner circumferential surface of the belt slab S, which therefore has an uneven inner circumferential surface where each of the projected parts has a flat top surface. The molding temperature of the belt slab S is 140 to 180° C., for example. The molding pressure is 0.5 to 1.5 MPa, for example. The molding time is 15 to 60 minutes, for example.

Further, the steam is released from the vulcanizer, and the vulcanizer is unsealed. The belt slab S molded on the cylindrical rubber mold 31 is removed, and the belt slab S is looped over a pair of slab holding axes 33 as shown in FIG. 8D. A grinding stone 34, which has V-shaped rib formation grooves extending in a circumferential direction of the grinding stone 34 and sequentially arranged on the outer circumferential surface along an axial direction of the grinding stone 34, is rotated and brought into contact with the outer circumferential surface of the belt slab S, and the belt slab S is also rotated on the pair of slab holding axes 33, thereby grinding the belt slab S all around the outer circumferential surface thereof. As a result, V-shaped ribs 15 are formed in the outer circumferential surface of the belt slab S as shown in FIG. 8E. If necessary, the belt slab S may be cut into parts in its lengthwise direction for grinding.

The belt slab S in which the V-shaped ribs 15 are formed by grinding is cut into pieces having a predetermined width, and turned inside out, thereby obtaining the V-ribbed belt B.

The method of manufacturing the V-ribbed belt B is not limited to this method. An outer mold whose inner circumferential surface is provided with V-shaped rib formation grooves arranged in the axial direction with a constant pitch may be used, and the belt formation body B' is pressed against the outer mold to form the belt slab S having the V-shaped ribs 15.

Second Embodiment

Figure 9:
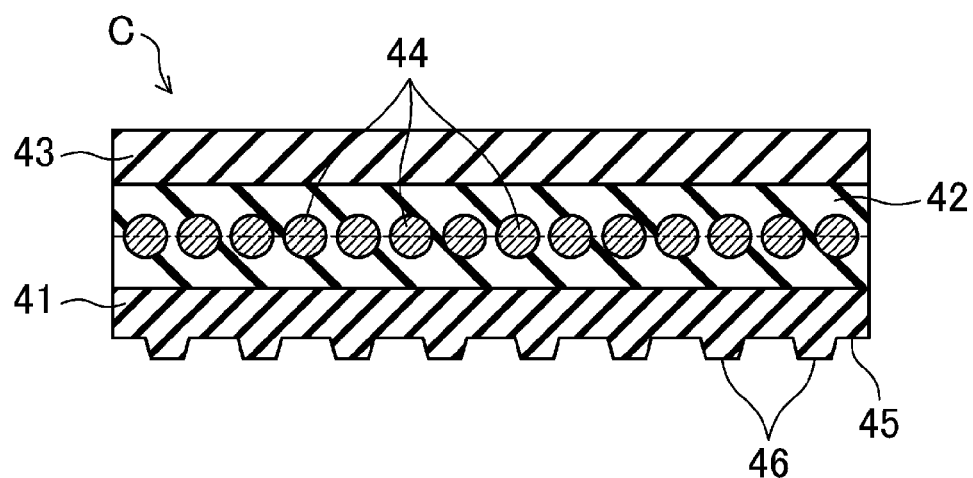
FIG. 9 is a cross-sectional view of a flat belt of the second embodiment.

FIG. 9 illustrates a flat belt C of the second embodiment. The flat belt of the second embodiment is of endless type used, for example, for transferring paper sheets, such as banknote transfer in ATMs and ticket transfer in automatic ticket checkers, or for driving main shafts of machine tools. The flat belt C of the second embodiment has a length of 100 to 6000 mm, a width of 3 to 300 mm, and a thickness of 0.8 to 2.0 mm, for example.

The flat belt C of the second embodiment includes a three-layered rubber-made flat belt body 40 which includes an inner rubber layer 41 constituting an inner surface of the belt coming in contact with a pulley, an intermediate adhesion rubber layer 42, and an outer rubber layer 43 constituting an outer surface of the belt. A cord 44 arranged so as to form a helical pattern at a predetermined pitch in a width direction of the belt is embedded in the adhesion rubber layer 42.

The inner rubber layer 41 is in the shape of a strip having a horizontally elongated rectangular cross-section, and has a thickness of 0.8 to 2.0 mm, for example. A surface of the inner rubber layer 41, that is, a surface which, as will be described later, comes in contact with a flat pulley when the belt is wrapped around the flat pulley, is configured to have an uneven surface 45 of rubber, and the top surface of each of projected parts of the uneven surface 45 is a flat surface. The uneven surface 45 on the surface of the inner rubber layer 41 has a detailed configuration similar to the configuration of the uneven surface 17 of the backside rubber layer 13 of the first embodiment.

In the flat belt C of the second embodiment, the surface of the inner rubber layer 41 which comes in contact with a flat pulley is formed to be the uneven surface 45 of rubber where each of the projected parts has the flat top surface 46. Thus, the state of contact of the surface of the inner rubber layer 41 with the flat pulley is a surface contact, which disperses the force applied. As a result, it is possible to reduce abrasion of the surface of the inner rubber layer 41 which is formed to be the uneven surface 45 of rubber.

The adhesion rubber layer 42 and the outer rubber layer 43 are also in the shape of a strip having a horizontally elongated rectangular cross-section, and have a thickness of 0.4 to 1.5 mm and a thickness of 0.3 to 1.0 mm, respectively, for example.

The inner rubber layer 41, the adhesion rubber layer 42, and the outer rubber layer 43 are made of a rubber composition produced by heating and pressing an uncrosslinked rubber composition prepared by kneading a rubber component blended with various ingredients, and crosslinking the kneaded product by a crosslinker. The rubber composition may be crosslinked using sulfur as the crosslinker, or may be crosslinked using organic peroxides as the crosslinker. The inner rubber layer 41, the adhesion rubber layer 42, and the outer rubber layer 43 may be made of different compositions, or may be made of the same composition.

Example rubber components of the rubber composition forming the inner rubber layer 41, the adhesion rubber layer 42, and the outer rubber layer 43 include, for example, ethylene-α-olefin elastomer (such as EPDM and EPR), chloroprene rubber (CR), chlorosulfonated polyethylene rubber (CSM), hydrogenated acrylonitrile-butadiene rubber (H-NBR), etc. Example ingredients include a reinforcing material, a filler, an antioxidant, a softener, a crosslinker, a vulcanization accelerator, etc.

The cord 44 is made of twisted yarn of polyethlene terephthalate (PET) fiber, polyvinyl alcohol (PVA) fiber, polyethylene naphthalate (PEN) fiber, para-aramid fiber, meta-aramid fiber, 4,6 nylon fiber, 6,6 nylon fiber, carbon fiber, or glass fiber, for example, which is subjected to an adhesion treatment using a resorcin/formalin/latex (RFL) solution before molding and vulcanization.

Figure 10:
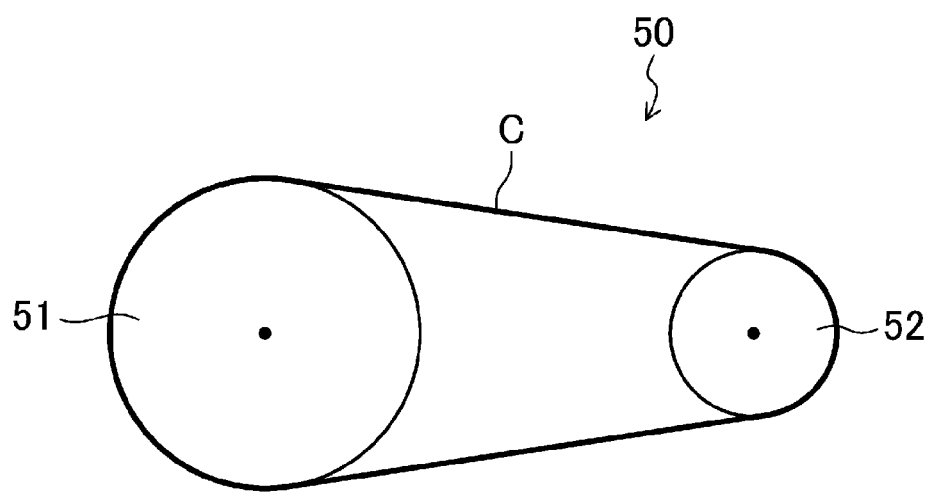
FIG. 10 illustrates a layout of pulleys of a belt transmission system using the flat belt of the second embodiment.

FIG. 10 illustrates a layout of pulleys of a belt transmission system 50 using the flat belt C of the second embodiment.

The belt transmission system 50 is configured to transmit power by the flat belt C wrapped around a pair of flat pulleys, that is, a drive pulley 51 and a driven pulley 52. The diameter of the drive pulley 51 is 30 to 1500 mm, for example, and the diameter of the driven pulley 52 is 30 to 1500 mm, for example.

The flat belt C of the second embodiment is used in the belt transmission system 50, and the surface of the inner rubber layer 41 which comes in contact with the drive pulley 51 and the driven pulley 52, i.e., flat pulleys, is formed to be the uneven surface 45 of rubber where each of the projected parts has the flat top surface 46. Thus, the state of contact of the surface of the inner rubber layer 41 with the drive pulley 51 and the driven pulley 52 is a surface contact, which disperses the force applied. As a result, it is possible to reduce abrasion of the surface of the inner rubber layer 41 formed to be the uneven surface 45 of rubber. Thus, it is possible to prevent the rubber powder which comes off due to abrasion from adhering to the drive pulley 51 or the driven pulley 52, and prevent generation of noise caused by the rubber powder.

Now, an example method of fabricating the flat belt C of the second embodiment will be described.

According to the method of manufacturing the flat belt C of the second embodiment, a cylindrical rubber mold 31 formed beforehand by a method similar to that in the first embodiment is used.

First, uncrosslinked rubber sheets (uncrosslinked rubber compositions for forming a belt) for the inner rubber layer 41, the adhesion rubber layer 42, and the outer rubber layer 43 are formed similarly to the first embodiment.

Next, the cylindrical rubber mold 31 obtained as described above is put on the cylindrical mold 30. The uncrosslinked rubber sheet for the outer rubber layer 43 and the uncrosslinked rubber sheet for the adhesion rubber layer 42 are sequentially wrapped around and layered on the outer circumference of the cylindrical rubber mold 31. The twisted yarn to be the cord 44 is wound around the resultant layers on the cylindrical rubber mold 31 in a helical manner, with a predetermined tension applied to the cord 14. After that, the uncrosslinked rubber sheet for the adhesion rubber layer 42 and the uncrosslinked rubber sheet for the inner rubber layer 41 are sequentially wrapped around and layered thereon, thereby forming a belt formation body.

Subsequently, a rubber sleeve is put on the belt formation body, which is placed in a vulcanizer and the vulcanizer is sealed. The vulcanizer is filled with high-temperature and high-pressure steam, and the belt formation body is held in the vulcanizer for a predetermined molding time. At this moment, cross-linking is promoted between the uncrosslinked rubber sheets, and the uncrosslinked rubber sheets are integrated together and combined with the cord 44. As a result, a cylindrical belt slab is molded. The molding temperature of the belt slab is 140 to 180° C., for example. The molding pressure is 0.5 to 1.5 MPa, for example. The molding time is 15 to 60 minutes, for example.

Then, the steam is released from the vulcanizer, and the vulcanizer is unsealed. The belt slab molded on the cylindrical rubber mold 31 is taken out and removed from the mold.

Lastly, the outer circumferential surface and the inner circumferential surface of the belt slab are ground to have uniform inner and outer thicknesses. After that, the belt slab is cut into pieces having a predetermined width, and turned inside out, thereby obtaining the flat belt C.

Other Embodiments

In the first and second embodiments, the V-ribbed belt B and the flat belt C have been described as examples of the power transmission belt, but power transmission belt is not specifically limited to these belts, and may be a V belt, a toothed belt, and so on.

EXAMPLES

V-Ribbed Belt

V-ribbed belts of the following Example and Comparative Examples 1 to 4 were manufactured. The characteristic configurations of the respective examples are also shown in Table 1.

Example

A V-ribbed belt in which a surface of the backside rubber layer was formed to be an uneven surface where each of projected parts had a flat top surface was manufactured by the same as in the first embodiment, and the obtained V-ribbed belt is referred to as Example.

In manufacturing the V-ribbed belt of Example, a rep weave fabric was subjected to an attachment treatment in which hydrogenated acrylonitrile-butadiene rubber (H-NBR) was attached to the rep weave fabric, and thereafter the fabric was pressurized in a vulcanizer to obtain a pressurized cloth, and the uneven surface of the pressurized cloth was transferred to the outer circumferential surface of a cylindrical rubber mold made of an uncrosslinked rubber composition of hydrogenated acrylonitrile-butadiene rubber (H-NBR). The resultant was used in Example.

The compression rubber layer and the backside rubber layer of the V-ribbed belt of this Example were made of a rubber composition in which nylon short fibers were blended in ethylene propylene diene monomer rubber (EPDM). The adhesion rubber layer was made of an ethylene propylene diene monomer rubber (EPDM) composition. The cord was made of twisted yarn of polyethlene terephthalate (PET) fiber subjected to an adhesion treatment using a resorcin/formalin/latex (RFL) solution before molding and vulcanization.

The V-ribbed belt of Example had a length of 1100 mm and a thickness of 4.3 mm. The height of the V-shaped rib was 2.0 mm, and the number of the ribs was three (a belt width was 10.68 mm). The outer diameter of each of the projected parts of the uneven surface in plan view was 0.85 mm. The surface roughness (Rz) of the uneven surface was 0.16 mm.

Comparative Example 1

A V-ribbed belt manufactured by the similar method as in Example, except that the cylindrical rubber mold was replaced by a rubber sleeve on which a rep weave fabric coated with rubber cement was put, is referred to as Comparative Example 1. The V-ribbed belt of Comparative Example 1 is configured such that the surface of the backside rubber layer is an uneven surface which is same as the surface of the rep weave fabric and of which the projected parts do not have flat top surfaces. The outer diameter of each of the projected parts of the uneven surface in plan view was 1.08 mm. The surface roughness (Rz) of the uneven surface was 0.35 mm.

Comparative Example 2

A V-ribbed belt manufactured by the similar method as in Example, except that the cylindrical rubber mold was replaced by a rubber sleeve on which a twill weave fabric coated with rubber cement was put, is referred to as Comparative Example 2. The V-ribbed belt of Comparative Example 2 is configured such that the surface of the backside rubber layer is an uneven surface which is same as the surface of the twill weave fabric and of which the projected parts do not have flat top surfaces. The outer diameter of each of the projected parts of the uneven surface in plan view was 0.25 mm. The surface roughness (Rz) of the uneven surface was 0.07 mm.

Comparative Example 3

A V-ribbed belt manufactured by the similar method as in Example, except that the cylindrical rubber mold was replaced by a rubber sleeve on which a plain weave fabric was put, is referred to as Comparative Example 3. The V-ribbed belt of Comparative Example 3 is configured such that the surface of the backside rubber layer is an uneven surface which is same as the surface of the plain weave fabric and of which the projected parts do not have flat top surfaces. The outer diameter of each of the projected parts of the uneven surface in plan view was 1.43 mm. The surface roughness (Rz) of the uneven surface was 0.51 mm.

Comparative Example 4

A V-ribbed belt manufactured by the similar method as in Example, except that the cylindrical rubber mold was replaced by a rubber sleeve whose outer circumferential surface was subjected to knurling, is referred to as Comparative Example 4. The V-ribbed belt of Comparative Example 4 is configured such that the surface of the backside rubber layer has a knurled pattern and of which the projected parts do not have flat top surfaces. The outer diameter of each of the projected parts of the uneven surface in plan view was 0.18 mm. The surface roughness (Rz) of the uneven surface was 0.19 mm.

(Method of Evaluation Test)

Figure 11:
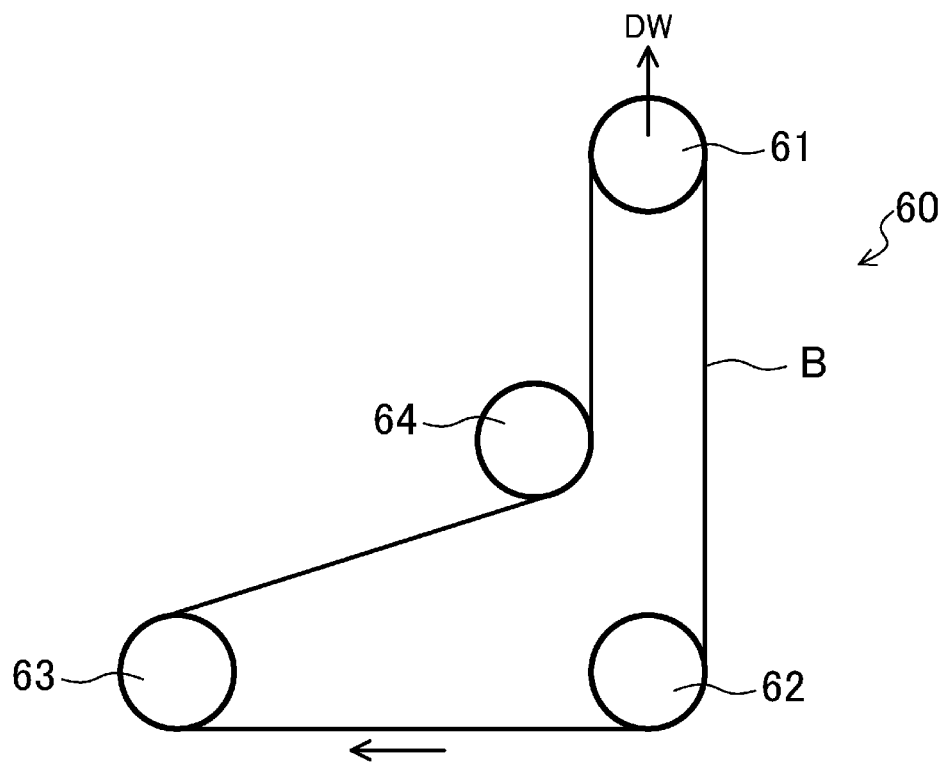
FIG. 11 illustrates a layout of pulleys of a belt running test machine configured to test adhesion.

FIG. 11 illustrates a belt running test machine 60 for testing adhesion of the surface of the backside rubber layer of the V-ribbed belt.

The belt running test machine 60 includes: a tension pulley 61 which is a flat pulley with a diameter of 65 mm; a driven pulley 62 which is a flat pulley with a diameter of 65 mm and located under the tension pulley 61; a drive pulley 63 which is a flat pulley with a diameter of 65 mm and located on the left side of the driven pulley 62; and an idler pulley 64 which is a ribbed pulley with a diameter of 65 mm and located at a lower left position of the tension pulley 61 that is also an upper right position of the drive pulley 63 such that a belt winding angle is 120 degrees. The tension pulley 61 is movable up and down so that tension can be applied to the V-ribbed belt B wrapped around the pulleys, and is capable of applying upward axial load due to constant dead weight DW.

Each of the V-ribbed belts B of Example and Comparative Examples 1 to 4 was wrapped around the belt running test machine 60 such that the surface of the backside rubber layer comes in contact with the tension pulley 61, the driven pulley 62, and the drive pulley 63 of the belt running test machine 60 and such that the V-shaped ribs of the compression rubber layer comes in contact with the idler pulley 64. After that, the dead weight DW of 800 N was applied upward to the tension pulley 61. Subsequently, the drive pulley was rotated at 4000 rpm (at this moment, the driven pulley was rotated at 3960 rpm) under an atmosphere of 20 to 30° C., thereby rotating the V-ribbed belt for 30 minutes. Adhesion of rubber to the surface of the backside rubber layer, the tension pulley 61, the driven pulley 62, and the drive pulley 63 was checked after the belt running.

<Evaluation Test Results>

Table 1 shows the evaluation test results.

TABLE 1

|  | Example | Comparative Example 1 | Comparative Example 2 | Comparative Example 3 | Comparative Example 4 |
| --- | --- | --- | --- | --- | --- |
| Surface Pattern of Backside Rubber Layer | Same as surface pattern of pressured rep weave fabric | Same as surface pattern of rep weave fabric | Same as surface pattern of twill weave fabric | Same as surface pattern of plain weave fabric | Knurled pattern |
| Adhesion | No | Yes | Yes | Yes | Yes |

The results show that rubber was not found adhering to the surface of the backside rubber layer after running of the V-ribbed belt of Example, whereas in Comparative Examples 1 to 4, rubber was found adhering to the surface of the backside rubber layer, the tension pulley 61, the driven pulley 62, and the drive pulley 63.

The present invention is useful as a power transmission belt and a method of manufacturing the power transmission belt.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt having an uneven surface of rubber which when the power transmission belt is wound around a flat pulley, comes in contact with the flat pulley, wherein
the uneven surface has projected parts being discretely disposed and each having a flat top surface in an approximately oval shape.

2. The power transmission belt of claim 1, wherein a total area of the flat top surfaces of the projected parts is 10 to 60% of an area of the uneven surface.

3. The power transmission belt of claim 1, wherein an outer diameter of each of the projected parts of the uneven surface in plan view is 0.3 to 1.4 mm.

4. The power transmission belt of claim 1, wherein a surface roughness (Rz) of the uneven surface is 0.05 to 0.25 mm.

5. The power transmission belt of claim 1, wherein the power transmission belt is a V-ribbed belt or a flat belt.

6. The power transmission belt of claim 1, wherein the uneven surface is a back surface of the power transmission belt.

7. A belt transmission system in which the power transmission belt of claim 1 is wound around a plurality of pulleys, wherein the plurality of pulleys include a flat pulley with which the uneven surface of the power transmission belt comes in contact.

8. The power transmission belt of claim 1, wherein a distance between the projected parts is 1.0-1.5 mm.

9. The power transmission belt of claim 1, wherein the projected parts are disposed in a regular manner.

10. A method of manufacturing the power transmission belt according to claim 1 comprising pressing a rubber composition against a molding surface that is a transfer surface of an uneven surface where each of projected parts has a flat top surface, thereby forming the uneven surface that comes in contact with the flat pulley.

* * * * *